United States Patent

Bobsein et al.

[11] Patent Number: 5,331,069
[45] Date of Patent: Jul. 19, 1994

[54] METHOD OF TREATING POLY(ARYLENE SULFIDE SULFONE) POLYMERS AND POLYMERS

[75] Inventors: Rex L. Bobsein; Earl Clark, Jr., both of Bartlesville, Okla.

[73] Assignee: Phillips Petroleum Company, Bartlesville, Okla.

[21] Appl. No.: 966,782

[22] Filed: Oct. 27, 1992

[51] Int. Cl.$^5$ .............................. C08G 75/14
[52] U.S. Cl. .................... 525/537; 524/170; 528/388
[58] Field of Search ............. 528/388; 525/537; 524/170

[56] References Cited

U.S. PATENT DOCUMENTS

| | | | |
|---|---|---|---|
| 3,607,843 | 9/1971 | Vidaurri, Jr. | 528/388 |
| 3,725,362 | 4/1973 | Walker | 525/537 |
| 4,301,274 | 11/1981 | Campbell | 528/388 |
| 4,405,767 | 9/1983 | Beever et al. | 525/537 |
| 4,740,569 | 4/1988 | Tieszen et al. | 525/537 |
| 4,774,276 | 9/1988 | Bobsein et al. | 524/399 |
| 4,946,912 | 8/1990 | Kawabata et al. | 525/537 |
| 5,015,702 | 5/1991 | Scoggins et al. | 525/537 |
| 5,128,445 | 7/1992 | Scoggins et al. | 528/492 |

*Primary Examiner*—John C. Bleutge
*Assistant Examiner*—Helen F. Lee
*Attorney, Agent, or Firm*—Marianne H. Michel

[57] ABSTRACT

Poly(arylene sulfide sulfone) polymers recovered from a reaction mixture produced by contacting at least one haloaromatic sulfone, at least one sulfur source, and a polar organic compound at polymerization conditions are treated with (1) a haloaromatic sulfone mixture comprising at least one haloaromatic sulfone and a polar organic compound followed by contacting the polymer with (2) a zinc compound. The two-step treatment improves the melt stability and extrudate quality of the polymer.

21 Claims, No Drawings

METHOD OF TREATING POLY(ARYLENE SULFIDE SULFONE) POLYMERS AND POLYMERS

BACKGROUND OF THE INVENTION

This invention relates to the treatment of poly(arylene sulfide sulfone) polymers and the polymers thus treated.

Poly(arylene sulfide sulfone) polymers are thermoplastic polymers of interest for film, fiber, molding, and composite application because of their high glass transition temperatures and good mechanical and electrical properties and chemical resistance.

An important aspect of thermoplastic polymers is the ability to withstand the high temperatures encountered in injection-molding processes for an extended period of time so that they can be molded rapidly and efficiently into almost any desired shape. An increased flow rate allows filling of thin-walled sections of molds at decreased pressures. Using higher molecular weight poly(arylene sulfide sulfone) polymers result in improved mechanical properties.

Another important aspect of such polymers is melt stability as evidenced by the extrudate quality, which includes gassiness preferably having a low number of bubbles in a given area, preferably a light color good clarity, and very smooth surface. It is also important that the extrudate quality be maintained for a period of time sufficient to produce molded objects, i.e. melt stability.

It is therefore desirable to produce a poly(arylene sulfide sulfone) polymer which would withstand high temperatures for an extended period of time without becoming unmanageably viscous, exhibit desirable melt flow properties, and exhibit good extrudate quality to be used in such areas as electrical components, wire coatings, automotive parts, composites, and the like.

SUMMARY OF THE INVENTION

Objects of the present invention are, therefore, to provide a process for treating poly(arylene sulfide sulfone) polymers for improving melt flow properties and extrudate quality or the polymers so produced.

In accordance with one aspect of the invention a process for treating a poly(arylene sulfide sulfone) polymer recovered from a reaction mixture produced by contacting at least one dihaloaromatic sulfone, at least one polar organic compound, and at least one sulfur source at polymerization conditions is provided, the treating process comprises contacting the poly(arylene sulfide sulfone) polymer with at least one haloaromatic sulfone and a polar organic compound to produce a haloaromatic sulfone-treated polymer; and contacting the haloaromatic sulfone treated polymer with a zinc compound.

DETAILED DESCRIPTION OF THE INVENTION

The poly(arylene sulfide sulfone) polymers treated in accordance with this invention are polymers that have been recovered from a reaction mixture produced by contacting at least one dihaloaromatic sulfone, at least one polar organic compound, and at least one sulfur source at polymerization conditions. The poly(arylene sulfide sulfone) polymers are represented by the general formula

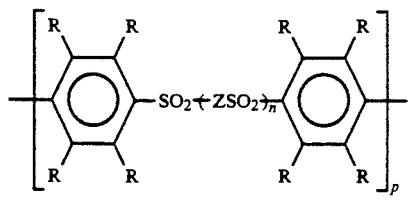

wherein P is the degree of polymerization and Z is a divalent radical selected from the group consisting of

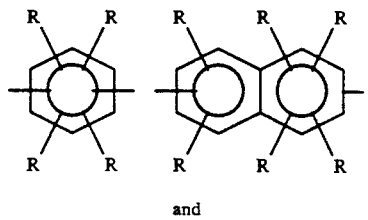

and

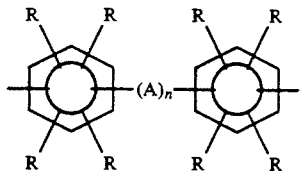

each n is 0 or 1; A is selected from the group consisting of oxygen, sulfur, sulfonyl, and $CR_2$; and R is selected from the group consisting of hydrogen and alkyl radicals having 1 to 4 carbon atoms, the total number of carbon atoms in all of the R groups in the dihaloaromatic sulfone molecule being 0 to 12. Preferably, each n is 0.

Dihaloaromatic sulfones that can be employed in preparing the poly(arylene sulfide sulfone) polymers have the formula

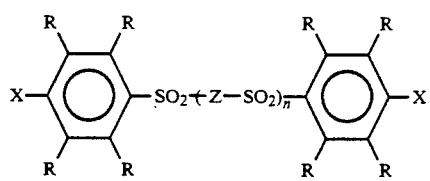

wherein each X is selected from the group of fluorine, chlorine, bromine and iodine, and Z, R and n are selected as defined above.

Examples of suitable dihaloaromatic sulfones that can be employed include bis(p-fluorophenyl)sulfone; bis(p-chlorophenyl)sulfone; bis(p-bromophenyl)sulfone; bis(p-iodophenyl)sulfone; p-chlorophenyl p-bromophenyl sulfone; 4-iodophenyl-3-methyl-4-fluorophenyl sulfone; bis(2-methyl-4-chlorophenyl)sulfone; bis(2,5-diethyl-4-bromophenyl)sulfone; bis(3-isopropyl-4-iodophenyl)sulfone; bis(2,5-dipropyl-4-chlorophenyl)sulfone; bis(2-buryl-4-fluorophenyl)sulfone; bis(2,3,5,6-tetramethyl-4-chlorophenyl)sulfone; 2-isobutyl-4-chlorophenyl-3-butyl-4-bromophenyl sulfone; 1,4-bis(4-chlorophenyl-sulfonyl)benzene; 1-methyl-2,4-bis(4-fluorophenylsulfonyl)benzene; 2,6-bis(4-bromophenylsulfonyl)naphthalene; 7-ethyl-1,5-bis(4-iodophenylsulfonyl)naphthalene; 4,4'-bis(4-chlorophenylsulfonyl)biphenyl; bis [p-(p-bromophenylsulfonyl)phenyl]ether;

bis [p-(p-chlorophenylsulfonyl)phenyl]sulfide; bis[p-(p-chlorophenylsulfonyl]sulfone; bis[p-(p-bromophenylsulfonyl)phenyl]methane; 5,5-bis[3-ethyl-4-(4-chlorophenylsulfonyl)phenyl]nonane, and the like, and mixtures thereof. Of the dihaloaromatic sulfones useful in the preparation of the poly(arylene sulfide sulfone) polymers, bis(p-halophenyl)sulfones are especially preferred, most preferably those containing a total number of carbon atoms in each molecule within the range of from 12 to 24. The presently preferred dihaloaromatic sulfone due to effectiveness and commercial availability is bis(p-chlorophenyl)sulfone.

Generally, in the preparation of poly(arylene sulfide sulfone) polymers, the amount of dihaloaromatic sulfone employed is in the range of from 0.7 to 1.3 moles per mole of sulfur source.

The sulfur source which is typically used in the preparation of poly(arylene sulfide sulfone) polymers is an alkali metal sulfide or an alkali metal hydrosulfide. Sulfur sources that can be employed in the preparation of the poly(arylene sulfide sulfone) polymer include lithium sulfide, sodium sulfide, potassium sulfide, rubidium sulfide, cesium sulfide, lithium hydrosulfide, sodium hydrosulfide, potassium hydrosulfide, rubidium hydrosulfide, cesium hydrosulfide, and mixtures thereof. The alkali metal sulfide can be used in anhydrous form, or preferably as a hydrate, or as an aqueous mixture. Sodium sulfide or sodium hydrosulfide are preferred.

When alkali metal hydrosulfides are employed, it is preferable that a base be present. Suitable bases include alkali metal hydroxides, alkali metal carbonates and mixtures thereof. Examples of bases which can be employed include, lithium hydroxide, sodium hydroxide, potassium hydroxide, cesium hydroxide, lithium carbonate, sodium carbonate, potassium carbonate, and cesium carbonate.

When a base is employed, the moles of base per mole of sulfur source are generally in the range of from about 0.5 to about 4 moles of base per mole of sulfur source, preferably from 0.5 to 2.0 moles of base per mole of sulfur source.

The polar organic compounds used in preparing the poly(arylene sulfide sulfone) polymers should be substantially liquid at the reaction temperatures and pressures employed. The polar organic compounds can be cyclic or acyclic and generally have 1 to 18 carbon atoms per molecule. Suitable polar organic compounds include organic amides, lactams, ureas and sulfones such as formamide, acetamide, N-methylformamide, N,N'-dimethylformamide, N,N'-diemthylacetamide, N-ethylpropionamide, N,N'-dipropylbutyramide, 2-pyrrolidone, N-methyl-2-pyrrolidone (NMP), $\epsilon$-caprolactam, N-methyl-$\epsilon$-caprolactam, N,N'-ethylenedi-2-pyrrolidone, hexamethylphosphoramide, tetramethylurea, sulfolane, and the like and mixtures thereof. Amides are preferred, and N-methyl-2-pyrrolidone is especially preferred.

The moles of polar organic compound per mole of sulfur source employed in the polymerization process can vary broadly, generally from about 1 to about 24, preferably from 2 to 16, and most preferably from 2 to 12.

An alkali metal carboxylate can be employed in preparing the poly(arylene sulfide sulfone) polymers. Usage of an alkali metal carboxylate generally results in an aromatic sulfide sulfone polymer of higher molecular weight than polymers prepared in the absence of alkali metal carboxylate.

Alkali metal carboxylates that can be employed in the polymerization process can be represented by the formula $R'(CO_2)_mM$ where $R'$ is a hydrocarbyl radical selected from alkyl, cycloalkyl, aryl, and alkaryl, said hydrocarbyl radical having 1 to 20 carbon atoms, m is 1-2, and M is an alkali metal selected from the group consisting of lithium, sodium, potassium, rubidium, and cesium. Preferably, $R'$ is an alkyl radical having 1 to 6 carbon atoms, or a phenyl radical, and M is lithium or sodium. If desired, the alkali metal carboxylate can be employed as a hydrate or as a solution or dispersion in water.

Examples of some alkali metal carboxylates which can be employed include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate, sodium butanedioate, sodium malonate, sodium glutarate, sodium phthalate, and mixtures thereof. The carboxylate can be prepared in situ by the reaction of the corresponding carboxylic acid with at least one alkali metal hydroxide. The presently preferred alkali metal carboxylate is sodium acetate because of its effectiveness and commercial availability.

The moles of alkali metal carboxylate per mole of sulfur source can vary broadly, generally in the range of from about 0.05 to about 4, preferably from about 0.1 to about 2, and most preferably from 0.15 to 1.5.

It is preferred that the poly(arylene sulfide sulfone) polymers be homopolymers. However, it is within the scope of this invention to employ copolymers.

The reaction temperature at which the polymerization is conducted can vary over a considerable range. Generally the reaction temperature will be within the range of from about 170° C. to about 240° C., preferably 180° C. to 220° C. The reaction time can vary widely, depending in part on the reaction temperature, but generally will be within the range of from about 10 minutes to about 3 days, preferably from 1 hour to 8 hours. The pressure need only be sufficient to maintain the dihaloaromatic sulfone, the polar organic compound, and the water substantially in the liquid phase.

The poly(arylene sulfide sulfone) polymers can be separated from their reaction mixture in any manner known to those of ordinary skill in the art. One suitable method employs the addition of a separation agent such as water in order to separate the polymer from the polar organic compound and non-polymeric liquid components and unconsumed reactants. The polymer can then be washed with water and optionally water-miscible solvents such as acetone or methanol in order to remove impurities and by-product salts. If desired, at least a portion of the washing can be conducted at an elevated temperature, for example up to about 200° C.

Subsequent to the recovery of the poly(arylene sulfide sulfone) polymer and washing, if employed, the poly(arylene sulfide sulfone) polymer is (1) treated with a haloaromatic sulfone mixture comprising at least one haloaromatic sulfone and a polar organic compound to produce a haloaromatic sulfone treated polymer, which is then (2) contacted with a zinc compound.

Haloaromatic sulfones employed in step (1) of the inventive process are represented by the formula

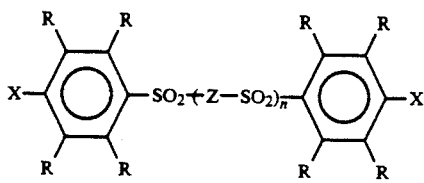

wherein each X is selected from the group consisting of fluorine, chlorine, bromine, iodine, and hydrogen, with the proviso that at least one X is a halogen; Z is a divalent radical selected from the group consisting of

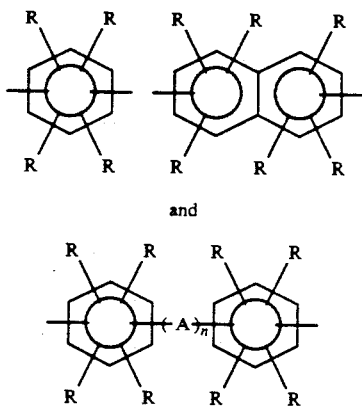

and wherein each n is 0 or 1; A is selected from the group consisting of oxygen, sulfur sulfonyl, and $CR_2$; and each R is selected from the group consisting of hydrogen and alkyl radicals having one to 4 carbon atoms, the total number of carbon atoms in all of the R groups in the molecule being 0 to 12, preferably n is 0. Suitable haloaromatic sulfones employed in the haloaromatic sulfone treatment of the polymer include the dihaloaromatic sulfones described above for the polymerization process as well as monohaloaromatic sulfones. The haloaromatic sulfone can be the same or different from those employed in the initial polymerization reaction.

It is preferable that the haloaromatic sulfone is a chloroaromatic sulfone. Excellent results have been obtained with bis(4-chlorophenyl)sulfone (BCPS), bis-4,4'-(4-chlorophenyl sulfonyl)biphenyl (BCPSB), 4-chlorophenyl phenyl sulfone (CPPS), and 4,4'-(4-chlorophenylsulfonyl)biphenyl (CPSB) and they are preferred.

The amount of haloaromatic sulfone employed in step (1) of the two-step treatment is the amount sufficient to increase the melt stability and improve the extrudate quality of the polymer. Generally, the haloaromatic sulfone will be present in an amount within the range of from about 0.01 to about 10.0 mole percent, preferably from about 0.05 to about 10.0, and most preferably 0.1 to 5.0 mole percent haloaromatic sulfone based on the moles of polymer.

Suitable polar organic compounds employed in the haloaromatic sulfone treatment of the polymer include the polar organic compounds described above. The polar organic compound can be the same or different from that employed in the initial polymerization reaction. It is preferred that the polar organic compound is an organic amide described above for the polymerization reaction, and N-methyl-2-pyrrolidone is especially preferred.

The amount of polar organic compound employed can vary broadly. Generally, the moles of polar organic compound per mole of polymer will be within the range of from about 1 to about 24, preferably from about 2 to about 16, and most preferably from 2 to 12 moles polar organic compound per mole of polymer.

Although it is not required, it is preferred that a base is present in step (1) of the inventive two-step process. Appropriate bases include alkali metal carbonates, alkali metal hydroxides, or mixtures thereof as described above. Sodium carbonate is preferred.

When a base is employed, the mole percent of base relative to the moles of polymer is generally in the range of from about 0.1 to about 5, preferably from 0.2 to 4 mole percent of base relative to the moles of polymer.

Although it is not required, it is preferred that an alkali metal carboxylate is present in step (1) of the inventive process. The alkali metal carboxylates which can be employed are those described above. The preferred alkali metal carboxylates are alkali metal acetates, and sodium acetate is most preferred.

When an alkali metal carboxylate is employed, the moles of alkali metal carboxylate per mole of polymer is generally in the range of from about 0.05 to about 5.0, preferably from about 0.1 to about 4.0, and most preferably 0.2 to 2.0 moles per mole of polymer.

Although it is not required, it is preferred that water is present in step (1) of the inventive process. When water is employed, generally the moles of water per mole of polar organic compound is in the range of from about 0.1 to about 5, preferably in the range of from 0.2 to 4 moles of water per mole of polar organic compound.

The polymers are contacted with the haloaromatic sulfone mixture at a temperature, pressure, and for a time sufficient to improve the melt flow properties and improve the extrudate quality stability of the polymer. Generally the contacting will be at a temperature of from about 0° C. to about 300° C., preferably, at a temperature of from 100° C. to 250° C. The pressure employed in the contacting step may vary from atmospheric to about 10 MPa (1500 psi).

The time for contacting the polymers with the haloaromatic sulfone mixture can vary widely, depending in part on the temperature and particular polymer employed. The contacting time will generally be within a range of from about 30 seconds to about 3 hours, preferably from 1 minute to 2 hours. Repeated treatments can be employed if desired, and the process can be carried out in several stages if desired.

Following the treatment of the poly(arylene sulfide sulfone) polymer with the haloaromatic sulfone mixture, the poly(arylene sulfide sulfone) polymer is contacted with a zinc compound at a sufficient temperature and pressure for a period of time sufficient to incorporate an amount of zinc cations effective to improve the melt stability of the polymer.

In this invention, any suitable zinc compound can be employed. It is preferred that the zinc compound be a water soluble zinc salt. It is even more preferred that the zinc salt be a zinc halide or a zinc carboxylate. The salts of zinc which are more preferred include zinc chloride, zinc bromide, zinc iodide, zinc acetate, and the like and mixtures thereof. The most preferred zinc salts due to their effectiveness and availability are zinc chloride and zinc acetate.

The amount of zinc compound contacted with the polymer in step (2) of the inventive process can vary depending upon the qualities desired in the final treated polymer. Generally, the amount of zinc compound contacted the polymer will be within the range of from about 0.01 to about 10, preferably from about 0.1 to about 10, and most preferably from 0.1 to 5 weight percent based on the total weight of the polymer.

It is preferred to employ the zinc compound in an aqueous solution. If such a solution is used, the concentration of the zinc salt in solution preferably ranges from 0.001 weight percent up to the solubility limits of the particular salt employed.

Generally, the polymers are contacted with the zinc compound at a temperature of about 0° C. to about 300° C. Preferably the polymers are contacted with the zinc compound at a temperature of 100° C. to 250° C.

The time for treating the polymers with the zinc compound in step (2) can vary widely, depending, in part, on the temperature of contacting and the nature of the polymers. The contacting time will generally be within a range of from about 30 seconds to about 3 hours, preferably from 1 minute to 1 hour. The pressure employed will generally range from atmospheric to about 10 MPa (1500 psi). Repeated zinc treatments can be employed, if desired, and the process can be carried out in several stages, if desired.

The two-step polymer treatment can be carried out with conventional equipment. A convenient method for carrying out the process is to contact the polymers and zinc compound in an enclosed tank provided with agitation. The contacting can be carried out in a single vessel or with a plurality of vessels.

Subsequent to treating the poly(arylene sulfide sulfone) polymer with the zinc compound, the polymer is recovered by conventional means, for example such as filtration. The polymer can subsequently be washed with water, and optionally water-miscible solvents at ambient or elevated temperatures.

The final recovered poly(arylene sulfide sulfone) polymer can optionally have other ingredients incorporated including extenders, fillers, pigments, plasticizers, stabilizers etc. It should be noted, however, that additives which might adversely affect the thermal stability of the polymer should be avoided. The poly(arylene sulfide sulfone) polymers treated by the present invention exhibit enhanced thermal stability.

In certain applications, it may be desirable to add additional strength to the polymer. Polymer strength can be increased by incorporating strengtheners such as fibers into the polymer to form a composite material. Preferred strengtheners, due to their effectiveness, are inorganic fibers such as asbestos, glass and carbon and the like. The polymers produced by the process of the invention are useful in the production of coatings, film, molded objects, and fibers. The polymers exhibit a good balance of properties for these uses, the heat deflection temperature being particularly outstanding.

The following examples will serve to show the present invention in detail by way of illustration and not by way of limitation.

EXAMPLES

The examples demonstrate that poly(phenylene sulfide sulfone) (PPSS) polymer can be improved or upgraded by an inventive two-step treatment comprising the steps of (1) contacting the PPSS polymer with a haloaromatic sulfone mixture comprising a haloaromatic sulfone and N-methyl-2-pyrrolidone (NMP) followed by treatment of the polymer recovered in step (1) with aqueous zinc acetate.

Example I demonstrates improved extrudate quality and increased melt flow when polymer is treated with the inventive two-step treatment process.

Example II demonstrates the effectiveness of various haloaromatic sulfone compounds in the inventive process.

Example III compares polymers produced by a method called "end-capping". In this process, additional haloaromatic sulfone is added to the reactor prior to completion of the polymerization process.

Example IV demonstrates the effectiveness of the two-step process using varying amounts of haloaromatic sulfone.

Example V describes a pilot plant scale two-step process for improving melt flow stability and extrudate quality.

The examples demonstrate that the inventive two-step polymer treatment improved extrudate quality ratings and increased melt flow stability.

The PPSS polymers for treatment in the following examples, except where indicated otherwise, were prepared as follows. A typical polymerization was carried out in a 90 gallon stirred reactor (500 rpm). The following materials were charged to the polymerization reactor: 4 gal (15.1 L) N-methyl-2-pyrrolidone (NMP), 6.6 lb (0.08 lb mole) sodium acetate ($CH_3CO_2Na$), 4.7 lb (0.4 lb mole) sodium carbonate ($Na_2CO_3$), 21.3 lb (1.2 lb mole) deionized water, 117.2 lb (0.4 lb mole) bis(4-chlorophenyl)sulfone (BCPS) and another 7.5 gal N-methyl-2-pyrrolidone. A separate vessel was charged with 15 gal N-methyl-2-pyrrolidone and 0.36 lb mole sodium hydroxide (NaOH) as a 28.9 lb portion of an aqueous stock solution of 49.9 wt % NaOH. The temperature of this mixture was increased to 149° C. and maintained at this temperature for one hour. To this mixture was added 0.4 lb mole of sodium hydrosulfide (NaSH) as a 38.4 lb portion of an aqueous stock solution of ca. 59 wt % NaSH. This mixture was maintained at 149° C. for 30 minutes to form a NaSH:NaOH:NMP complex. The mixture containing the NaSH:NaOH:NMP complex was added to the polymerization reactor using an 11 gallon flush of NMP to complete the transfer. The reactor was sealed, purged with nitrogen and then pressured with nitrogen. The reaction mixture was heated to 200° C. at 2.8° C. per minute and then maintained at 200° C. for 150 minutes. The mixture was then heated to 210° C. at 1.7° C. per minute and maintained at 210° C. for 10 minutes. At the end of the polymerization, a 29 lb (1.61 lb mole) portion of deionized water quench was added to the reactor and the diluted mixture was maintained at 210° C. for 10 minutes. The temperature of the mixture was reduced to 149° C. at a rate of 1.4° C. per minute before the addition of 10 gal of deionized water followed by cooling to 121° C. The polymer slurry was filtered to recover solids. Washing steps utilized a slurry mixing tank and a nylon fabric filter cloth on a moving horizontal belt filter system to separate the PPSS polymer from the wash/rinse liquid. The solids were slurried for 10 minutes at 177° C. with 80 gallons of deionized water containing 350 g zinc acetate. The mixture was cooled and solids were recovered on a belt filter before rinsing with 82° C. deionized water. The solid product was hot air dried. The second slurry wash was carried out for 20 minutes at 177° C. with a mixture of 80 gallons of deionized water and 700 mL of acetic acid. The mixture was cooled and solids were recovered on a belt filter before rinsing with 82.5° C. deionized water. The recovered PPSS solid was hot air dried to give 72.7 lb of product.

Except where indicated, the two-step treatment procedures were carried out in a 2 gallon stainless steel autoclave with means for stirring, temperature and pressure measurements, external heating and internal cooling. Conventional methods were used for washing and recovering polymers from the slurry mixtures. Polymers were dried in heated vacuum ovens or with hot air.

The materials employed in step (1) of the two-step process, except where indicated, were present in the following amounts and were charged to an appropriately equipped two gallon stainless steel autoclave: 372.5 g (1.5 moles) PPSS polymer, 1190 g (12 moles) NMP, 3.18 g (0.03 moles) $Na_2CO_3$, 216 g (12 moles) water, 123 g (1.5 moles) sodium acetate, and 4.3 g (0.015 mole bis(4-chlorophenyl)sulfone (BCPS). Each step (1) reaction mixture was heated to 200° C. and maintained at that temperature for 10 minutes. The reaction mass was cooled to ambient temperature and the solid product was isolated by suction filtration. The recovered solid was washed three times with alternate 4-liter portions of hot (90° C.) and ambient temperature deionized water. After the final ambient temperature water wash, the haloaromatic sulfone treated polymer was recovered by suction filtration and dried in a heated vacuum oven.

Where indicated, the polymers recovered from the various step (1) treatments were charged to an appropriately equipped two gallon stainless steel autoclave along with 3.49 g of zinc acetate and 4 liters of deionized water. The autoclave was purged several times with nitrogen and then pressured to 50 psi $N_2$. The reaction mixture was heated to 185° C. and maintained at that temperature for 30 minutes. The reaction mass was cooled to ambient temperature and solid material was recovered by suction filtration. The isolated solid was washed three times as described above in step (1). The recovered solid from step (2) was dried in a heated vacuum oven.

Melt flow was determined by the method ASTM D 1238-86, Condition 316/5.0, modified to use preheat times of five or thirty minutes at a temperature of 343° C. or 15 minutes at 371° C. Melt flow values are reported in units of grams per ten minutes (g/10 min.).

The extrudate from the melt flow measurement was given a set of numerical ratings (1 represents the best and 4 represents the worst rating) to describe the extrudate quality in terms of gassiness, color, clarity and surface:

(i) gassiness: the number of bubbles/inch of extrudate (average of initial 3-inch extrudate)
1 represents 0–1 bubble, 2 represents 2–5 bubbles, 3 represents 5–10 bubbles, and 4 represents >10 bubbles.

(ii) color:
1 represents very light amber, 2 represents light amber,
3 represents medium amber, and 4 represents dark amber.

(iii) clarity:
1 is transparent, 2 is nearly transparent,
3 is translucent, and 4 is opaque.

(iv) surface:
1 is very smooth, 2 is smooth,
3 is rough, and 4 is very rough.

EXAMPLE I

This example demonstrates the inventive two-step polymer treatment to improve the melt flow stability and extrudate quality of a PPSS sample. Step 1 in Run 104, also included 6.30 g (0.05 moles) sodium sulfite.

Melt flow data and extrudate quality ratings on the PPSS polymer materials are given in Table 1. The terms in Table 1 are defined as follows.

MF is the melt flow at preheat times of five or thirty minutes at a temperature of 343° C. Melt flow values are reported in units of grams per ten minutes (g/10 min.).

Quality is the extrudate rating of the polymer at 5 minutes and 30 minutes for gassiness, color, clarity, and surface rated from 1–4 as described above.

BCPS is bis(4-chlorophenyl)sulfone.
Zn is zinc acetate.

TABLE 1

| Run | Polymer Treatment | 5 minute MF | 5 minute Quality | 30 minute MF | 30 minute Quality |
|---|---|---|---|---|---|
| 101 | none | 19 | 3,3,1,4 | 20 | 3,3,1,4 |
| 102 | Zn | 19 | 1,2,1,1 | 22 | 4,3,1,4 |
| 103 | BCPS, Zn | 33 | 2,2,1,1 | 47 | 1,2,1,2 |
| 104 | BCPS, Zn* | 39 | 1,2,1,1 | 45 | 1,2,1,2 |

*sodium sulfite present

The results in Table 1 demonstrate the effectiveness of the two-step polymer treatment. Run 101, with no treatment, exhibited an unsatisfactory extrudate quality at both the 5 minute and 30 minute hold time. Run 102 was treated with aqueous zinc acetate of step (2) only. Run 102 exhibited a very satisfactory extrudate quality rating at the 5 minute hold time, but the quality fell to unsatisfactory at the 30 minute hold time. Runs 103 and 104 were treated with the indicated components of step (1) and aqueous zinc acetate of step (2). It is clear from the table that the two-step treatment improves the extrudate quality of poly(phenylene sulfide sulfone) at the 30 minute holding time compared to no treatment or zinc only treatment. In addition, the melt flow is increased at both the 5 minute and 30 minute holding time when employing the two-step treatment.

EXAMPLE II

This example demonstrates the use of various haloaromatic sulfones in step (1) to upgrade a poor-quality PPSS polymer. The two-step polymer treatments were carried out using the unsatisfactory polymer and 1 mole percent of the various haloaromatic sulfones indicated below. Other reagents and amounts were used as described above. Melt flow data and extrudate quality ratings are given in Table 2.

The terms in Table 2 are defined as follows:
BCPS is bis(4-chlorophenyl)sulfone;
BCPSB is bis-4,4'(4-chlorophenylsulfonyl)biphenyl;
CPPS is 4-chlorophenyl phenyl sulfone;
CPSB is 4(4-chlorophenylsulfonyl)biphenyl;
MF is the melt flow at 343° C. at 5 and 30 minute holding time and at 371° C. at 15 minute holding time in g/10 minutes; and
Quality is the extrudate rating of gassiness, color, clarity, and surface rated from 1–4 as described above.

TABLE 2

| Run | Polymer Treatment | 5 minute MF | 5 minute Quality | 30 minute MF | 30 minute Quality | 15 minute MF | 15 minute Quality |
|---|---|---|---|---|---|---|---|
| 201 | None | 31 | 4,4,4,4 | NM* | NM | NM | NM |
| 202 | Zn only | 45 | 1,1,1,1 | 43 | 3,2,1,1 | 80 | 4,2,4,4 |
| 203 | BCPS, Zn | 66 | 2,2,1,1 | 92 | 2,2,1,1 | 202 | 1,2,1,1 |
| 204 | BCPSB, Zn | 84 | 2,2,1,1 | 83 | 2,2,1,1 | 182 | 1,1,2,1 |
| 205 | CPPS, Zn | 92 | 1,2,1,1 | 112 | 1,2,1,1 | 223 | 1,2,1,1 |
| 206 | CPSB, Zn | 72 | 1,2,1,1 | 102 | 1,2,1,1 | 257 | 2,3,1,1 |

*Not Measured

Referring to the results in Table 2, it can be seen that the haloaromatic sulfones BCPS, BCPSB, CPPS, and CPSB were effective in upgrading PPSS polymer when employed in step 1 of the inventive two-step polymer treatment. Run 201 with, no treatment, exhibited very unsatisfactory extrudate quality in gassiness, color, clarity, and surface. Run 202 with only zinc treatment (step 2), exhibited a decrease in quality at the 30 minute hold time, and very unsatisfactory rating at the higher temperature, 15 minute hold time. The two-step treated PPSS polymers in Runs 203–205, treated with BCPS, BCPSB, and CPPS exhibited very satisfactory extrudate quality ratings at the 5, 30 and 15 minute holding times, i.e. no numerical designation was greater than 2. The polymer in Run 206, treated with CPSB, exhibited a very satisfactory rating at 5 and 30 minutes and a satisfactory rating at 15 minutes. The two-step treated polymers exhibited an increase in melt flow over the zinc treated polymer at all three holding times. It is also noted that the melt flow for each of the polymers treated with the inventive two-step treatment increased at the 30 minute holding time over the 5 minute holding time.

It is evident that the two-step inventive treatment using various haloaromatic sulfones in step 1 was effective in upgrading the quality of the PPSS polymer and increasing the melt flow at 5, 30, and 15 minute hold times.

EXAMPLE III

In Example III, the level of haloaromatic sulfone used in step (1) of the inventive two-step treatment relative to the amount of PPSS polymer was varied. The two-step treatment was conducted as described above using the amount of haloaromatic sulfone indicated below.

Melt flow data and extrudate quality ratings on the treated and untreated PPSS polymer materials are given in Table 3. MF is melt flow at 343° C. at 5 and 30 minute holding time and at 371° C. at 15 minute holding time in g/10 minutes. Quality is the extrudate rating of gassiness, color, clarity, and surface at the holding time indicated rated from 1–4 as described above. The amount of haloaromatic sulfone charged to the reactor is in mole percent based on the moles of PPSS polymer employed.

TABLE 3

| Run | Polymer Treatment | 5 minute MF | 5 minute Quality | 30 minute MF | 30 minute Quality | 15 minute MF | 15 minute Quality |
|---|---|---|---|---|---|---|---|
| 300 | None | 31 | 4,4,4,4 | NM* | NM | NM | NM |
| 301 | Zn only | 45 | 1,1,1,1 | 43 | 3,2,1,1 | 80 | 4,2,4,4 |
| 302 | 1% BCPS, Zn** | 53 | 1,1,1,1 | 73 | 1,2,1,1 | 134 | 1,2,1,1 |
| 303 | 1% BCPS, Zn | 77 | 1,2,1,1 | 89 | 1,2,1,1 | 214 | 1,2,1,1 |
| 304 | 3% BCPS, Zn | 106 | 1,1,1,1 | 114 | 1,1,2,1 | 227 | 3,2,1,1 |
| 305 | 3% BCPS, Zn | 135 | 1,1,1,1 | 0 | 4,4,4,4 | NM | NM |

*Not Measured
**No Na$_2$CO$_3$ in haloaromatic sulfone mixture

Referring to the results in Table 3, it is evident that the inventive two-step treatment for upgrading PPSS polymer is operable with either 1 mole percent haloaromatic sulfone or 3 mole percent haloaromatic sulfone. In Runs 302–305, the melt flow increased at the 5 minute hold time compared to no treatment and zinc only treatment. In Runs 302–304, the melt flow increased at the 30 and 15 minute hold times compared to no treatment and zinc only treatment. In Runs 302–305, the 5 minute extrudate quality ratings of the treated polymers were an excellent 1,1,1,1 to very satisfactory 1,2,1,1. In Runs 302–304 the 30 minute hold extrudate quality ratings were very satisfactory. Run 305 appears to be an anomaly.

Since the original untreated PPSS sample exhibited a melt flow of 31 and an unsatisfactory extrudate quality rating of 4,4,4,4 at the 5 minute hold time, it can be concluded that the inventive two-step treatment was effective in increasing the melt flow and improving the extrudate quality of unacceptable PPSS polymer in a process wherein haloaromatic sulfone level in step (1) was either 1 mole percent or 3 mole percent based on treated PPSS polymer.

EXAMPLE IV

This example demonstrates the application of the inventive two-step treatment to upgrade unacceptable PPSS polymer on a larger scale. The polymer was prepared as described above.

In step 1 of the two-step polymer treatment, 72.7 lb (0.3 lb mole) of PPSS polymer recovered from a run as described in Example I, was charged to a 90 gallon reactor along with 27.3 gal (2.35 lb mole) N-methyl-2-pyrrolidone, 42.4 lb (2.35 lb mole) deionized water, 24.1 lb (0.3 lb mole) sodium acetate, 283 g (0.62 lb, 0.006 lb mole) sodium carbonate and 384 g (0.85 lb, 0.003 lb mole) bis(4-chlorophenyl)sulfone. The reactor was sealed and purged twice with nitrogen. The temperature of the stirred reaction mixture was raised to 210° C. at the rate of 2.8° C./minute and maintained at 210° C. for a period of 30 minutes. The reaction was quenched by charging 21.2 lb (1.18 lb mole) deionized water. The temperature of the mixture was reduced to 149° C. at a rate of 2.5° C. per minute before the addition of 5 gallons of deionized water followed by further cooling to 121° C. The slurry was filtered to remove the solid polymer.

In step 2, the haloaromatic sulfone treated solid from step 1 was slurried at 177° C. for 20 minutes with 80 gallons of deionized water which contained 350 g (0.77 lb) zinc acetate. The mixture was cooled and solid was recovered on a belt filter of nylon fabric filter cloth. The solid was rinsed with 82° C. deionized water and dried with hot air.

Extrudate quality ratings and melt flow data on the PPSS polymer are given in Table 4.

MF is melt flow at 343° C. at 5 and 30 minute holding time in g/10 minutes. Quality is the extrudate rating of gassiness, color, clarity, and surface at the holding time indicated rated from 1-4 as described above.

TABLE 4

| Run | Polymer Treatment | 5 minute | | 30 minute | |
|---|---|---|---|---|---|
| | | MF | Quality | MF | Quality |
| 401 | None | 25 | 1,2,1,2 | 0 | 4,4,4,4 |
| 402 | BCPS, Zn | 36 | 1,2,1,1 | 39 | 1,2,1,1 |

Referring to the results in Table 4, it can be seen that the untreated PPSS extrudate rating after the 5 minute hold was a very satisfactory 1,2,1,2. However, after the 30 minute hold, the melt flow decreased to zero and the extrudate quality rating deteriorated to 4,4,4,4.

The ratings of the two-step treated PPSS extrudate after both the 5 minute hold and the 30 minute hold were a very satisfactory 1,2,1,1. Thus, it is evident that the two-step treatment of the instant invention was very effective in upgrading the extrudate quality of the unacceptable PPSS polymer.

The treated polymer exhibited improved melt stability. Attention is also called to the higher melt flow of the treated material relative to the melt flow of the untreated PPSS both at the 5 minute and minute hold time. These higher melt flow on the treated PPSS material indicate an improvement in processability particularly in regard to injection moldability.

EXAMPLE V

This example describes comparative runs in which the PPSS polymerization process involved endcapping near the end of the polymerization prior to recovery of the polymer. In Runs 503-510, a small amount of haloaromatic sulfone (about 1 mole % based on initial charge) was added to the polymerization reactor shortly before quenching the reaction. The thus treated polymer is referred to as "end-capped PPSS" polymer. The polymers in Runs 501 and 502 were independent runs which were not contacted with a haloaromatic sulfone prior to quenching and recovery. All polymers in this example were treated with aqueous zinc acetate after recovery.

To produce the endcapped polymers, a typical polymerization was conducted in the following manner. A two gallon stainless steel reactor equipped with temperature and pressure measuring means, stirring means, external heating means and internal cooling coils was charged with 430.8 g (1.5 moles) bis(4-chlorophenyl)-sulfone (BCPS), 123 g (1.5 moles) sodium acetate, 318 g (3 moles) sodium carbonate, 180 g (10 moles) deionized water, 1.5 moles of sodium hydrosulfide (charged a 141.2 g portion of an aqueous stock solution of ca. 59 wt % NaSH) and 1190 g (12 moles) N-methyl-2-pyrrolidone (NMP). The reactor was sealed, purged several times with nitrogen and then pressured to 40 psi with nitrogen. The stirred reaction mixture was heated to 200° C. and maintained at that temperature for three hours; the pressure was about 175 psi. In Runs 503-510, 0.015 moles of the haloaromatic sulfone indicated and 100 mL N-methyl-2-pyrrolidone were charged to the reaction mixture, to produce end-capped polymer. This step was omitted in Runs 501 and 502. In all Runs, the system was maintained at 200° C. for an additional 30 minutes before cooling the system to about 22° C. The reaction mixture was transferred to a Waring blender, stirred for a short time and poured into a vacuum filter funnel. Approximately four liters of deionized water was used to wash the polymer on the filter plate. The recovered solid was washed four times with alternate 4-liter portions of hot (90° C.) and ambient temperature deionized water. After each wash, solids were recovered by suction filtration. A final 4-liter aliquot of ambient temperature deionized water was flushed through the polymer filter cake. The polymer was dried under vacuum at 170° C.

All polymers were then treated with zinc acetate as follows. A two gallon stainless steel reactor equipped with temperature and pressure measuring means, stirring means, external heating means and internal cooling coils was charged with polymer prepared above, 4 liters of deionized water, and 3.57 g of zinc acetate. The stirred mixture was heated to 185° C. and maintained at that temperature for one hour before cooling the system to about 20° C. The reaction mixture was poured into a vacuum filter funnel to remove solids. The filter cake was washed with four liters of deionized water. Alternate hot and ambient temperature washes of the solid product were carried out as described above before drying the solid under vacuum at 170° C.

The terms in Table 5 are defined as follows:
BCPS is bis(4-chlorophenyl)sulfone;
BCPSB is bis-4,4'(4-chlorophenylsulfonyl)biphenyl;
CPPS is 4-chlorophenyl phenyl sulfone;
CPSB is 4(4-chlorophenylsulfonyl)biphenyl;
MF is the melt flow at 343° G at 5 and 30 minute holding time in g/10 minutes; and
Quality is the extrudate rating of gassiness, color, clarity, and surface rated from 1-4 as described above.

TABLE 5

| Run | Endcapper | 5 minute | | 30 minute | |
|---|---|---|---|---|---|
| | | MF | Quality | MF | Quality |
| 501 | None | 25 | 1,3,1,1 | 22 | 2,3,1,1 |
| 502 | None | 30 | 1,3,1,1 | 29 | 1,3,2,1 |
| 503 | BCPS | 12 | 1,3,1,1 | 11 | 1,3,1,2 |
| 504 | BCPS | 24 | 1,3,1,1 | 22 | 2,3,1,3 |
| 505 | BCPSB | 42 | 1,2,1,1 | 39 | 3,3,1,1 |
| 506 | BCPSB | 72 | 2,2,1,1 | 67 | 3,2,1,1 |
| 507 | CPPS | 25 | 1,2,1,1 | 21 | 1,3,1,2 |
| 508 | CPPS | 32 | 2,2,1,1 | 24 | 3,3,2,3 |
| 509 | CPSB | 96 | 2,2,1,1 | 91 | 4,2,1,1 |
| 510 | CPSB | 78 | 2,2,1,1 | 79 | 4,2,1,2 |

Referring to the extrudate quality ratings in Table 5, it can be seen that none of the endcapped PPSS polymers were designated as very satisfactory at the 30 minute hold time, i.e. quality ratings of 1 or 2. The quality rating at 30 minutes relative to the rating at 5 minutes decreased in all runs. Also Runs 501-509 decreased in melt flow at the minute holding time relative to the 5 minute holding.

While this invention has been described in detail for the purpose of illustration, it is not to be construed as limited thereby, but is intended to cover all changes and modifications within the spirit and scope thereof.

That which is claimed is:

1. A process for treating a recovered poly(arylene sulfide sulfone) polymer recovered from a reaction mixture produced by contacting at least one dihaloaromatic sulfone, at least one polar organic compound, and at least one sulfur source at polymerization conditions, said process for treating comprising:
    (1) contacting said recovered poly(arylene sulfide sulfone) polymer with a haloaromatic sulfone mixture comprising at least one haloaromatic sulfone and a polar organic compound to produce a haloaromatic sulfone treated polymer;

wherein said contacting is under conditions sufficient to improve the melt flow properties of said polymer;

wherein said haloaromatic sulfone is represented by the formula

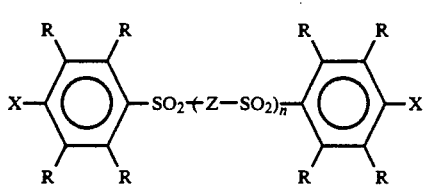

wherein each X is selected from the group consisting of fluorine, chlorine, bromine, iodine, and hydrogen, with the proviso that at least one X is a halogen; Z is a divalent radical selected from the group consisting of

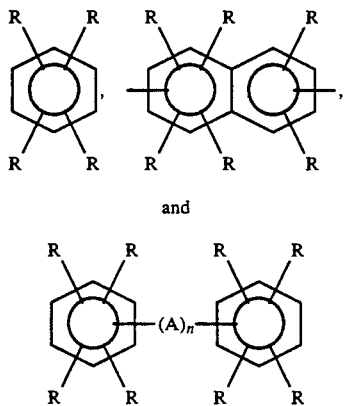

wherein each n is 0 or 1; A is selected from the group consisting of oxygen, sulfur sulfonyl, and $CR_2$; and each R is selected from the group consisting of hydrogen and alkyl radicals having one to 4 carbon atoms, the total number of carbon atoms in all of the R groups in the molecule being 0 to 12; and (2) contacting said haloaromatic sulfone treated polymer with a zinc compound;

wherein said contacting is under conditions sufficient to incorporate an amount of zinc cations effective to improve the melt stability of said polymer.

2. A process according to claim 1 wherein said at least one haloaromatic sulfone is a chloroaromatic sulfone;
said polar organic compound is an organic amide; and
said zinc compound is a water soluble zinc salt.

3. A process according to claim 2 wherein said chloroaromatic sulfone is selected from bis(4-chlorophenyl)-sulfone, bis-4,4'(4-chlorophenylsulfonyl)biphenyl, 4-chlorophenyl phenyl sulfone, or 4,4'(4-chlorophenylsulfonyl)biphenyl;
said polar organic compound is N-methyl-2-pyrrolidone; and
said zinc compound is selected from a zinc halide or a zinc carboxylate, 4. A process according to claim 3 wherein said zinc compound selected from zinc chloride or zinc acetate and is employed in an aqueous solution.

5. A process according to claim 1 wherein said at least one haloaromatic sulfone is present in an amount in the range of from about 0.01 mole percent to about 10.0 mole percent based on the moles of polymer;
said polar organic compound is present in an amount in the range of from about 1 mole to about 24 moles per mole of polymer; and
said zinc compound is present in an amount in the range of from about 0.01 weight percent to about 10.0 weight percent based on the weight of. the polymer.

6. A process according to claim 5 wherein said at least one haloaromatic sulfone is present in an amount in the range of from about 0.05 mole percent to about 10.0 mole percent based on the moles of polymer;
said polar organic compound is present in an amount in the range of from about 2 moles to about 16 moles per mole of polymer; and
said zinc compound is present in an amount in the range of from about 0.05 weight percent to about 10.0 weight percent based on the weight of the polymer.

7. A process according to claim 1 wherein said polymer is also contacted with a base in step (1) selected from alkali metal hydroxides or alkali metal carbonates.

8. A process according to claim 1 wherein said polymer is also contacted with an alkali metal carboxylate in step (1).

9. A process according claim 1 wherein said poly(arylene sulfide sulfone) is poly(phenylene sulfide sulfone).

10. A process according to claim 1 wherein said contacting in step (i) and step (2) is at a temperature in the range of from about 0° C. to about 300° C.

11. A process for treating recovered poly(phenylene sulfide sulfone) polymer recovered from a reaction mixture produced by contacting bis(p-chlorophenyl)-sulfone, a sulfur source, and a polar organic compound, said process for treating comprising:

(1) contacting said recovered poly(phenylene sulfide sulfone) polymer with a haloaromatic sulfone mixture comprising bis(p-chlorophenyl) sulfone, sodium acetate, and N-methyl-2-pyrrolidone to produce a haloaromatic sulfone-treated polymer;

wherein said contacting is under conditions sufficient to improve the melt flow properties of said polymer; and (2) contacting said haloaromatic sulfone treated polymer with zinc acetate;

wherein said contacting is under conditions sufficient to incorporate an amount of zinc cations effective to improve the melt stability of said polymer.

12. A process according to 11 wherein said contacting in step (1) and step (2) is at a temperature in the range of from 100° C. to 250° C.

13. A process according to claim 11 wherein the contacting in each step occurs over a time period of about 30 seconds to about 3 hours.

14. A process according to claim 13 wherein the contacting in each step occurs over a time period of 1 minute to 2 hours.

15. A process according to claim 11 wherein said bis(p-chlorophenyl)sulfone is present in an amount in the range of from 0.1 mole percent to 5.0 mole percent based on the moles of polymer;
said sodium acetate is present in an amount in the range of from 0.2 moles to 5.0 moles per mole of polymer;

said N-methyl-2-pyrrolidone is present in an amount in the range of from 2 moles to 12 moles per mole of polymer; and said zinc compound is present in an amount in the range of from 0.1 weight percent to 5.0 weight percent based on the weight of the polymer.

16. A process according to claim 15 further comprising a base in step (1) selected from an alkali metal carbonate or an alkali metal hydroxide.

17. A process according to claim 16 wherein said base is sodium carbonate.

18. A process according to claim 16 wherein said base is present in an amount in the range of from about 0.1 to about 5 mole percent based on the moles of polymer.

19. A process according to claim 16 wherein said contacting in step (1) and step (2) is at a temperature of from 100° C. to 250° C.

20. A poly(arylene sulfide sulfone) polymer treated according to the process of claim 1.

21. A poly(arylene sulfide sulfone) polymer treated according to the process of claim 11.

* * * * *

UNITED STATES PATENT AND TRADEMARK OFFICE
CERTIFICATE OF CORRECTION

PATENT NO. : 5,331,069
DATED : July 19, 1994
INVENTOR(S) : Rex L. Bobsein, et al It is certified that error appears in the above-indentified patent and that said Letters Patent is hereby corrected as shown below:

Column 16, claim 10, line 33, delete "(i)" and insert therefor --(1)--.

Signed and Sealed this

Twenty-seventh Day of September, 1994

Attest:

BRUCE LEHMAN

*Attesting Officer*　　*Commissioner of Patents and Trademarks*